(12) United States Patent
Abarca et al.

(10) Patent No.: US 10,134,106 B2
(45) Date of Patent: Nov. 20, 2018

(54) METHOD AND DEVICE FOR SELECTIVE DISPLAY REFRESH

(71) Applicant: ATI TECHNOLOGIES ULC, Markham, Ontario (CA)

(72) Inventors: Gabriel Abarca, Richmond Hill (CA); David I. J. Glen, Toronto (CA)

(73) Assignee: ATI Technologies ULC, Markham, Ontario (CA)

( * ) Notice: Subject to any disclaimer, the term of this patent is extended or adjusted under 35 U.S.C. 154(b) by 344 days.

(21) Appl. No.: 14/018,869

(22) Filed: Sep. 5, 2013

(65) Prior Publication Data

US 2014/0063034 A1    Mar. 6, 2014

Related U.S. Application Data

(60) Provisional application No. 61/697,261, filed on Sep. 5, 2012.

(51) Int. Cl.
| | | |
|---|---|---|
| *G06T 1/60* | (2006.01) | |
| *G06F 3/14* | (2006.01) | |
| *G09G 5/399* | (2006.01) | |
| *G09G 5/395* | (2006.01) | |

(52) U.S. Cl.
CPC .............. *G06T 1/60* (2013.01); *G06F 3/1415* (2013.01); *G09G 5/399* (2013.01); *G09G 5/395* (2013.01); *G09G 2310/04* (2013.01); *G09G 2320/103* (2013.01); *G09G 2360/18* (2013.01)

(58) Field of Classification Search
CPC ..... G06T 15/00; G06T 15/405; G06T 15/005; G06T 1/60; G09G 2360/18; G09G 2360/12

See application file for complete search history.

(56) References Cited

U.S. PATENT DOCUMENTS

| | | | | |
|---|---|---|---|---|
| 5,801,717 A | * | 9/1998 | Engstrom | G09G 5/006 345/422 |
| 6,847,358 B1 | * | 1/2005 | Ford | G09G 5/363 345/419 |

(Continued)

FOREIGN PATENT DOCUMENTS

| | | | | |
|---|---|---|---|---|
| WO | WO201112794 | * | 10/2011 | ......... H04N 19/0089 |
| WO | 2012/035632 A1 | | 3/2012 | |
| WO | WO2012/113923 A1 | | 8/2012 | |

OTHER PUBLICATIONS

International Search Report and Written Opinion dated Oct. 23, 2013 in related International Application No. PCT/CA2013/050682.

(Continued)

*Primary Examiner* — Samantha (Yuehan) Wang
(74) *Attorney, Agent, or Firm* — Faegre Baker Daniels LLP

(57) ABSTRACT

A method of and device for providing image frames is provided. The method includes outputting portions of a first frame that have changed relative to the one or more other frames without outputting portions of the first frame that have not changed relative to the one or more other frames. Each of the portions are determined to be changed if a rendering engine has written to a frame buffer for a location within boundaries of the portion. This outputting is done in response to one or more portions of a first frame having changed relative to one or more other frames.

14 Claims, 4 Drawing Sheets

(56) References Cited

U.S. PATENT DOCUMENTS

| | | | |
|---|---|---|---|
| 6,943,801 B2* | 9/2005 | Rosenberg | G09G 5/395 |
| | | | 345/204 |
| 7,038,689 B2* | 5/2006 | Willis | G09G 5/395 |
| | | | 345/531 |
| 7,262,776 B1 | 8/2007 | Wilt et al. | |
| 7,671,865 B2* | 3/2010 | Willis | G06F 12/1027 |
| | | | 345/545 |
| 2004/0179019 A1 | 9/2004 | Sabella et al. | |
| 2011/0148892 A1 | 6/2011 | Schreiner et al. | |
| 2012/0033738 A1* | 2/2012 | Bakke | H04N 19/433 |
| | | | 375/240.24 |
| 2012/0293545 A1 | 11/2012 | Engh-Halstvedt et al. | |
| 2012/0327096 A1 | 12/2012 | Minematsu | |
| 2013/0163680 A1* | 6/2013 | Oertel | H04N 19/0089 |
| | | | 375/240.29 |

OTHER PUBLICATIONS

Japanese Patent Office; Office Action; Japanese Application No. 2015-530251; dated May 9, 2017.
Chinese Patent Office; First Office Action; Chinese Application No. 201380046073.8; dated Nov. 30, 2016.
European Patent Office; European Extended Search Report; EP Application No. 13835341.2; dated Apr. 4, 2016.
European Patent Office; European Examination Report; EP Application No. 13835341.2; dated Jun. 13, 2017.

* cited by examiner

METHOD AND DEVICE FOR SELECTIVE DISPLAY REFRESH

PRIORITY

The present application is a non-provisional application of and claims the priority of U.S. Provisional Patent Application Ser. No. 61/697,261 titled METHOD AND DEVICE FOR SELECTIVE DISPLAY REFRESH filed Sep. 5, 2012, the disclosure of which is hereby expressly incorporated by reference.

FIELD OF THE DISCLOSURE

The present disclosure is related to methods and devices for providing efficiencies during processing of a frame of visual data (e.g., a frame of graphics—which includes video—data) for display. The present disclosure is related more specifically to methods and devices for selectively updating pieces of a frame that are updated.

BACKGROUND

Double-buffered or swap-chain based OS graphics interfaces use a combination of software and/or hardware-accelerated compositing and frame buffer swap chains to produce a final frame buffer to be displayed. A swap chain is a collection of buffers that are used for displaying frames to the user. Each time an application presents a new frame for display, the next buffer in the swap chain takes the place of the currently displayed buffer (the screen/front buffer). This process is called swapping or flipping. The process of moving the back buffer to the front buffer is called surface flipping. Because the graphics processor simply uses a pointer to a surface to represent the front buffer, a simple pointer change is all that is needed to set a back buffer as the front buffer. For each buffer flip, the entire buffer is passed to the display controller for outputting or display.

However, in many instances, a large portion of the screen does not change between successive frames. Thus, for this large portion, the reading, processing, and publishing/outputting of the frame results in no change in what is presented on the display device (panel). Thus, a portion of the processing capacity and energy (power) expended in providing a frame to a display device fails to result in a perceptible reward for that effort.

The Video Electronics Standards Association (VESA) Digital Packet Video Link (DVPL) standard promulgated in 2004 mentions the possibility of having partial screen refreshes where unchanged portions do not refresh, but the standard provides no details or explanation as to how this would be achieved.

Accordingly, there exists a need for an improved method and apparatus that provides for transmission of new frame data to a display device without requiring transmission of a full frame.

DETAILED DESCRIPTION OF EMBODIMENTS

In an exemplary and non-limited embodiment, aspects are embodied in a method of providing image frames. A method includes outputting portions of a first frame that have changed relative to the one or more other frames without outputting portions of the first frame that have not changed relative to the one or more other frames. Each of the portions are determined to be changed if a rendering engine has written to a frame buffer for a location within boundaries of the portion. This outputting is done in response to one or more portions of a first frame having changed relative to one or more other frames.

Briefly, in another exemplary embodiment, a display refresh device is provided including: a rendering engine operative to write image information to one or more memory buffers; a plurality of memory buffers each having a plurality of portions; indicators of a change status for each of the plurality of portions of each of the plurality of memory buffers, each portion being determined to be changed if a rendering engine has written to a frame memory buffer for a location within boundaries of the portion; and a display controller operative to interpret the indicators to selectively read portions out of a first memory buffer of the plurality of memory buffers.

In another exemplary embodiment, a computer readable media having non-transitory instructions thereon is provided. When the instructions are interpreted by a processor, they cause the processor to: determine if one or more portions of a first frame have changed relative to one or more other frames; determine if one or more portions of the first frame have not changed relative to the one or more other frames, each portion being determined to be changed if a rendering engine has written to a frame buffer for a location within boundaries of the portion; and output the portions of the first frame that have changed relative to the one or more other frames without outputting portions of the first frame that have not changed relative to the one or more other frames.

In yet another exemplary embodiment, a method of displaying content is provided. The method including receiving video signal data, including partial frames, from an interface, the partial frames being those portions of frames in a frame buffer where a rendering engine has written to the frame buffer for a location within boundaries of the portion; and adding the partial frame to part of another frame to create an assembled frame.

Figure 1:
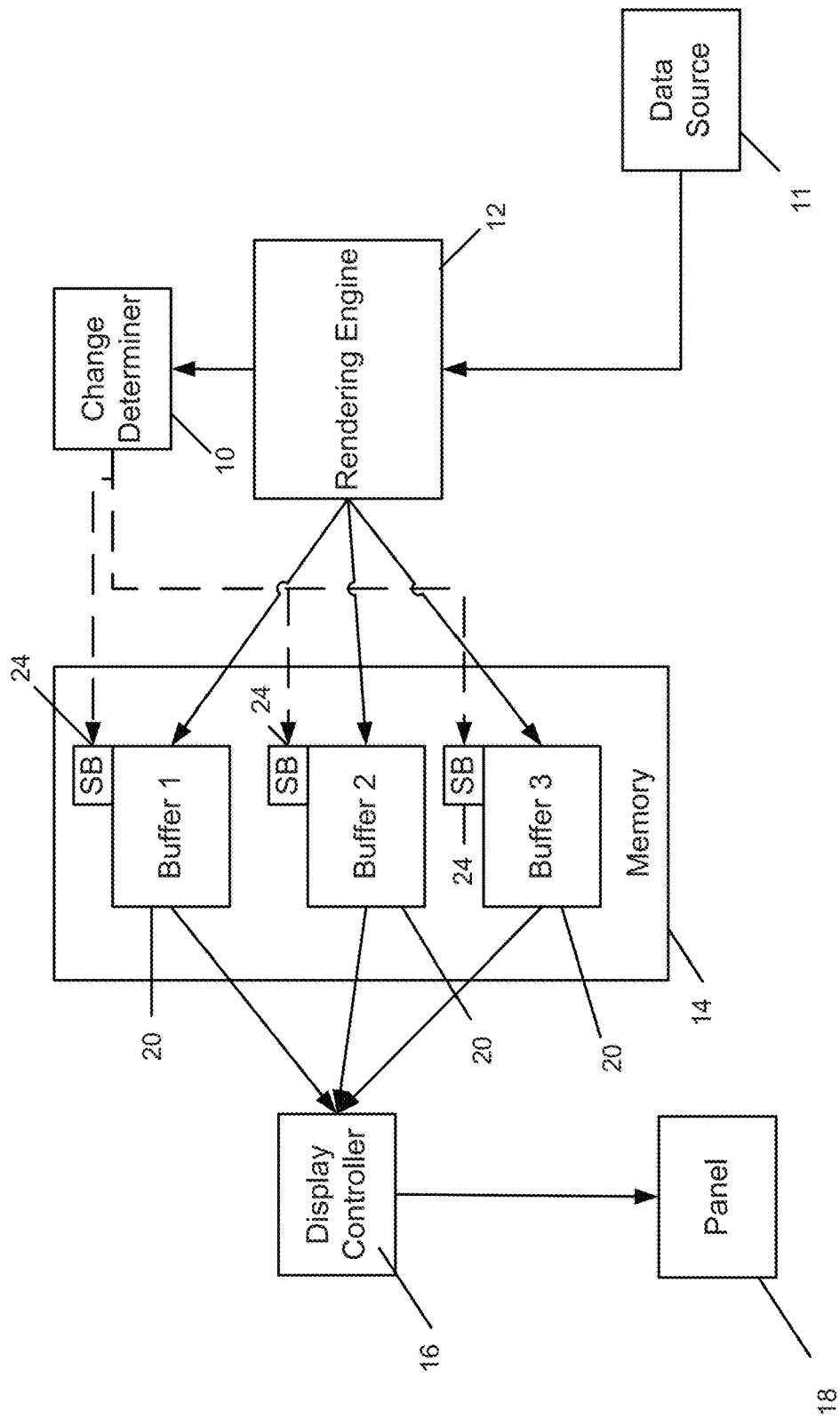
FIG. 1 is a diagram showing architecture of a swap-chain based graphic interface in an embodiment of certain aspects of the present invention.

FIG. 1 shows architecture for providing video information to a display (panel 18). The architecture shows a swap-chain based graphics interface. The interface includes change determiner 10, rendering engine 12, memory 14, display controller 16, and panel 18.

Rendering engine 12 is software or hardware that converts specifications for images into data representing pixels. In one example, rendering engine 12 is distinct from a memory controller. In another embodiment, rendering engine 12 is a subsystem of an integrated circuit that also includes a memory controller. Display controller 16 is an integrated circuit responsible for the production of a video signal in a computing or game system. Use of the term "display controller" is not meant to exclude display processors or graphics processing units. Indeed, display controller 16 is meant to encompass any software and/or hardware that is able to read image information out of buffer 20 and direct it on to be displayed on panel 18. Panel 18 is any display device that allows user perception of the pixels of the image.

"Swap chain" refers to a plurality of virtual frame buffers 20 located within memory 14. The series of virtual frame buffers 20 are utilized for frame rate stabilization and several other functions. The swap chain is shown as existing in graphics memory, but it can exist in system memory as well. Without a swap chain, stuttering and/or incomplete image update rendering can result. Existence and utilization of a swap chain is required by many graphics application programming interfaces (APIs).

Figure 3:
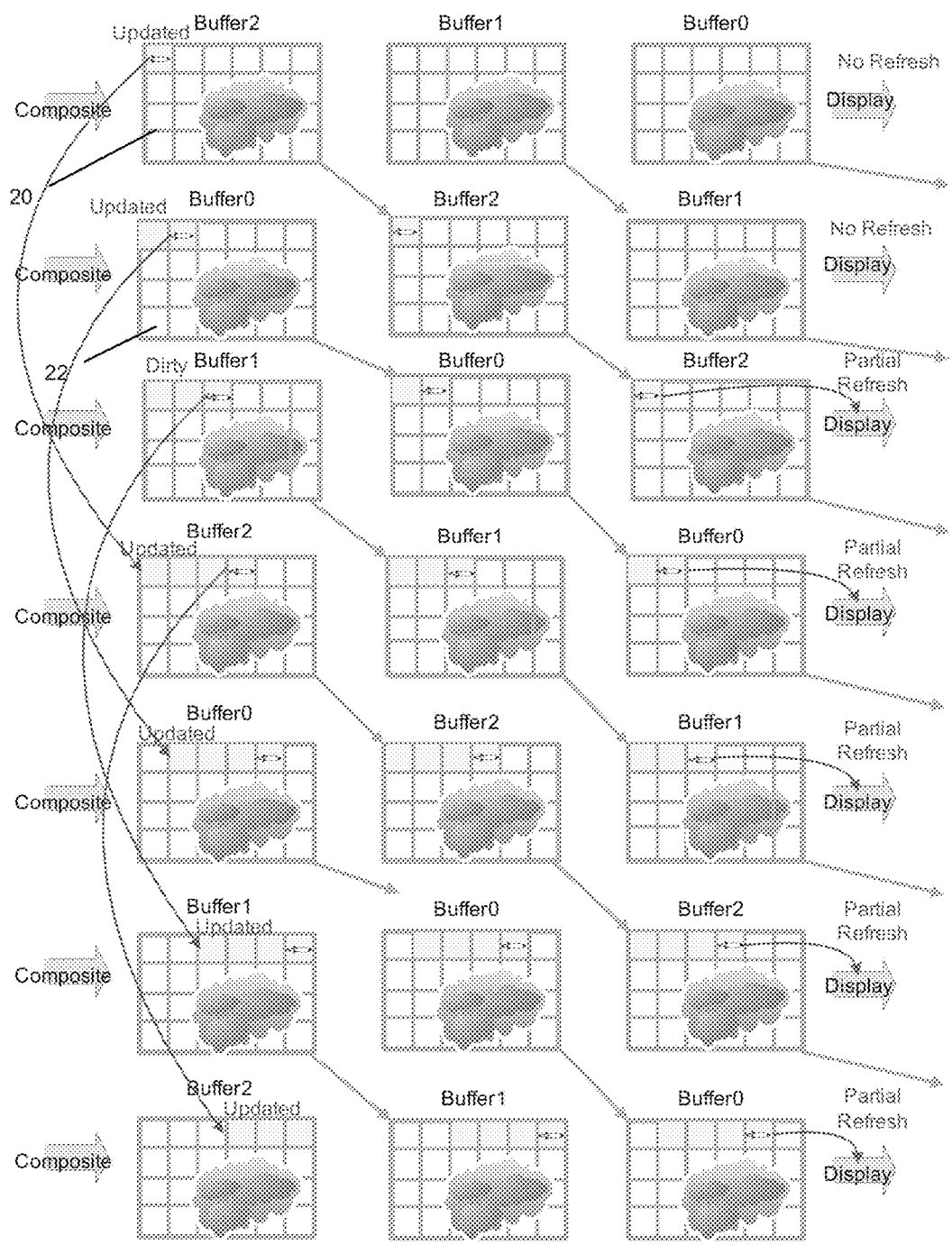
FIG. 3 is a diagram showing exemplary buffers and frames held thereby and their treatment by the graphic interface in an embodiment of certain aspects of the present invention.

One of the frame buffers 20, referred to as the screen buffer, is the buffer 20 that is read by the display controller 16 to be output to the panel 18. Each time a new frame is displayed the first back buffer in the swap chain takes the place of the screen buffer. This is called presentation or swapping. Once presented, the screen buffer is returned to the back of the swap chain for further processing. This movement of buffers 20 is not spatial movement, but rather conceptual movement and movement by designation. Designation of a frame buffer 20 as the screen buffer is effected through references in display controller 16. Changes in which buffer 20 is designated as the screen buffer are effected by programming in display controller 16. Display controller 16 changes which frame buffer 20 it designates as the screen buffer and looks to that buffer 20 for the next frame to be presented to panel 18. Once the frame is retrieved from the screen buffer 20 and the rendering engine 12 indicates that the next buffer 20 in the swap chain is ready, then the internal designation of the screen buffer is switched to the next buffer 20 in the swap chain. FIG. 3 shows conceptual movement of buffers 20 in a three-buffer chain. In each line of FIG. 3, the right-most buffer is the designated screen buffer.

Figure 2:
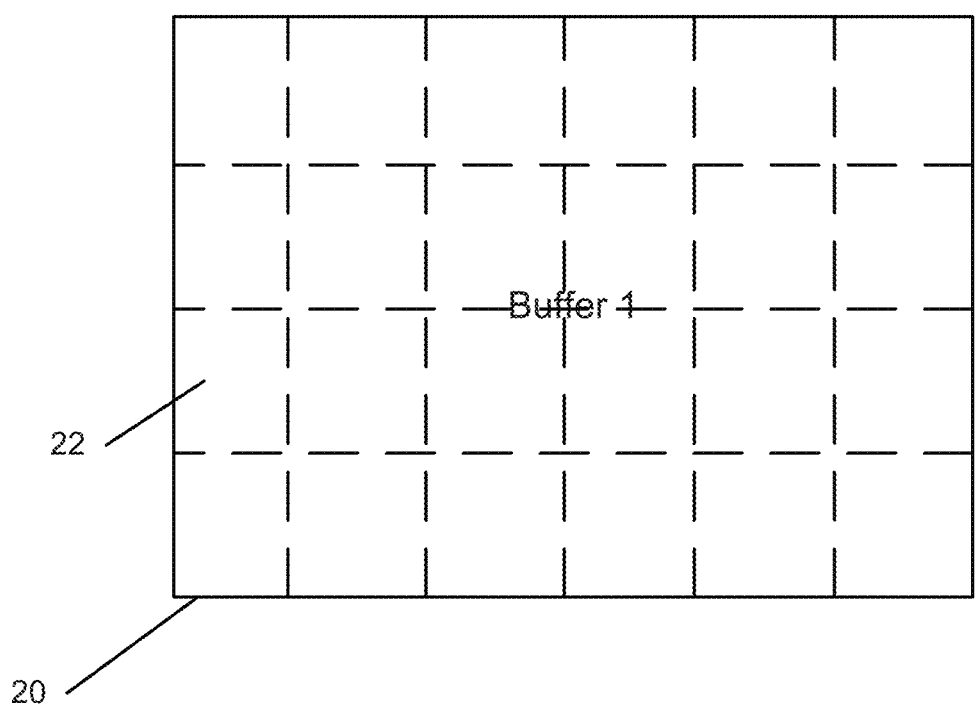
FIG. 2 is a diagram showing a swap-chain based graphic interface employing a grid system and write detection functionality in an embodiment of certain aspects of the present invention.

In the embodiment of the present disclosure, each frame, and thus each buffer, is segmented (virtually) into finite sub-sections via a "mask". In the present disclosure, the mask sub-elements are rectangles. FIG. 2 shows the conceptual sub-division of the frames on buffers 20. By way of example, FIG. 2 shows each frame divided into twenty-four sub-sections 22. The mask provides that each buffer 20 is provided with identically sized and positioned sub-sections 22.

In a three-buffer system, each buffer handles every third frame. Data Source 11, directs rendering engine to write pixels to buffers 20. Change determiner 10, which can either be a processor executing software or can be dedicated hardware, determines which pixels (or which portions of memory buffers 20 as discussed below) have been written to for the current frame to be rendered relative to last time the memory buffer 20 was used. (In a three buffer system, this would be three frames prior to the current frame). In another embodiment, change determiner 10 determines which pixels (or portions) have changed between the current frame to be rendered and the three previously rendered frames.

In one embodiment, data source 11 provides that rendering engine 12 only writes pixels of the current frame that have changed relative to the previous write to the buffer 20 (or that have changed within the last three frames). While writes to the buffer 20 are not always known to be indicative of change, any write is assumed to be indicative of change.

When pixels are rendered via rendering engine 12 to the current back buffer 20, a determination is made by change determiner 10 as to which portions (sub-sections 22) (FIG. 2) of the current back buffer 20 are written to by rendering engine 12. This information is stored in memory 14. In the present example, the information is stored as a plurality of state bits 24 in memory 14. Each sub-section 22 is assigned a state bit 24. It should be appreciated that while each buffer 20 is shown in FIG. 1 as having a single state bit 24 associated therewith, multiple state bits are actually associated with each buffer 20 such that there is a state bit 24 for each portion (or sub-section 22) of buffer 20. When rendering engine 12 writes to the current back buffer 20 (or has written to a similarly positioned sub-section 22 in one of the other buffers 20 since last writing to the current back buffer 20) the state bit 24 for the sub-section 22 is turned on to mark the sub-section 22 as "dirty." The denotation as "dirty" is used to indicate that a value within the sub-section 22 has changed or must be assumed to have changed. Similarly, if the state bit for a sub-section is turned off, it is indicated as "clean" or unchanged.

Stated differently, it is assumed that writing by rendering engine 12 is indicative of change. This writing by rendering engine 12 is compared to the mask of sub-sections 22 to determine which sub-sections 22 have been written to and thereby determine what sub-sections 22 have changes. These determinations of change are stored via state bits 24. The changed sub-sections 22 for the current buffer 20 are combined with the changed sub-sections for the other buffers 20 (as noted by their associated state bits 24) to obtain a list of sub-sections 22 that have changed since the last display of the current buffer 20.

Display controller 16 reads the state bits 24 to know which sub-sections 22 of buffers 30 must be read and published to its output (which leads to panel 18).

In the current example, state bits 24 are set as a function of where rendering engine 12 writes. However, it should be appreciated that other ways of setting state bits 24 and other ways of instructing display controller are envisioned. One such additional way is by having change determiner 10 interface directly with the mask to set the state bits.

In one example, display controller reads a contiguous section of a frame that is large enough to encompass all sub-sections 22 that have been noted as dirty. In another example, display controller only reads the sub-sections 22 that are noted as dirty. In this example, display controller is able to selectively read individual non-contiguous sub-sections 22.

Additionally, the clean/dirty status of sub-sections 22 can be achieved by a combination of explicit operating system-to-display driver calls and/or display-driver based intercepts in existing operating system-to-display driver calls that know the updated sub-sections 22 and instruct the display controller 16 how to update the clean/dirty sub-section 22 status.

By transmitting less than a whole screen to panel 18, power savings are achieved relative to processing and transmitting a whole frame. In that less than a full frame is transmitted, panel 18 is able to handle receiving less than a full frame of information. Panel 18 holds a frame that is displayed or is to be displayed in a buffer. The received sub-sections 22 are then overwritten to the buffer of panel 18 such that portions of the previous frame are retained for which new sub-sections 22 are not received. The frame is then published from the buffer to the screen of panel 18.

Figure 4:
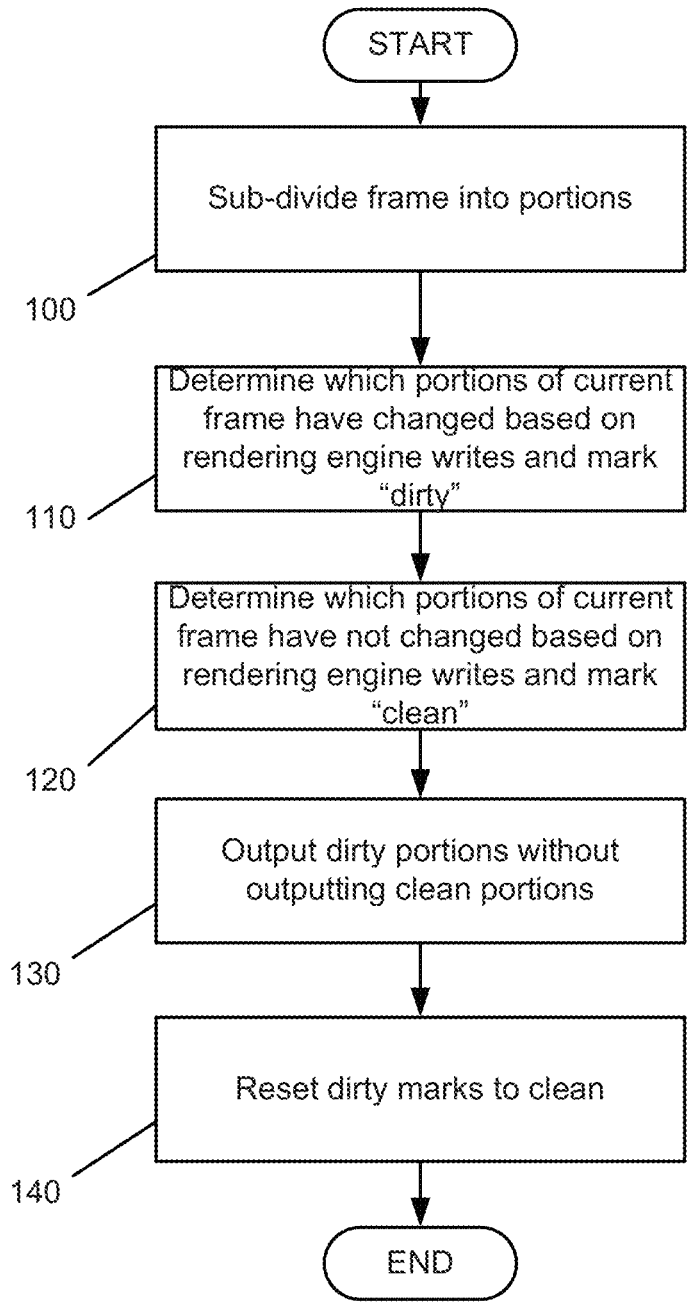
FIG. 4 is a flowchart showing the process performed by the architecture of FIG. 1 in an embodiment of certain aspects of the present invention.

The process will now be discussed with reference to FIGS. 3 & 4. FIG. 3 shows three buffers 20 of a swap chain (buffer0, buffer1, and buffer2). For each row, the right-most buffer 20 is being designated by the display controller as the screen buffer. The left and center buffers 20 in a row are back buffers. Each frame is sub-divided into sub-sections or portions, block 100. Shaded sub-sections 22 are those which are noted as dirty/updated by a state bit or otherwise.

There is no change between Buffer0 of row 1 and Buffer1 of row 2. Accordingly, no sub-sections 22 are noted as being dirty. When display controller 16 reads the state bits of Buffer1, display controller 16 is told that all sub-sections 22 are clean, block 120. Thus, display controller 16 provides no refresh to panel 18, block 130. Accordingly, for the time slot in which Buffer1 is to be displayed, Buffer0 of row 1 is actually displayed. This is desired because the two frames are identical and the desired display on panel 18 is achieved without display controller 16 outputting Buffer 1 to panel 18.

However, between Buffer1 of Row 2 and Buffer2 of Row 3, the top left corner sub-section 22 has changed. Rendering Engine has thus written to the top left corner sub-section 22. This writing causes state bit 24 for this section to be noted as dirty, block 110. Display controller 16 reads the state bit and knows that the upper left sub-section 22 represents a dirty sub-section 22. Display controller 16 further knows that the upper left sub-section 22 is the only dirty sub-section 22 within the frame. Thus, display controller 16 only reads and outputs the upper left sub-section 22 to panel 18, block 130. Again, the desired image is displayed on panel 18 without requiring that the full image be transmitted to the panel immediately before its display. Once upper left sub-section 22 is read out by display controller 16, state bit 24 (or state bits 24) are re-set to clean, block 140.

Similarly, Buffer 0 of row 4 presents two sub-sections 22 that represent changes. Thus, display controller 16 only reads and outputs the dirty sub-sections 22 to panel 18. Again, the desired image is displayed on panel 18 without requiring that the full image be transmitted to the panel immediately before its display.

Looking now at the left side of FIG. 3, the process of writing into buffers 20 and marking of sub-sections 22 as dirty is shown. Writing, by rendering engine 12, a pixel within a sub-section 22 causes that sub-section 22 to be marked as dirty and state bits 24 are set to reflect that writing. Pixels are written for two reasons. The first reason is that the pixel has changed in a frame between 1) the last time the current buffer was used and 2) the buffer preceding the current buffer ("interim changes"). The second reason is that the pixel has changed between 1) the buffer preceding the current buffer and 2) the current buffer ("current changes").

In addition to the setting of state bits 24, rendering engine 12 separately keeps track of which sub-sections 22 have been marked dirty via state bits due to "current changes" (as opposed to those marked dirty due to interim changes). Rendering engine 12 may or may not use state bits 24 to aid in keeping track of which areas are dirty due to current changes. Furthermore, any method known in the art may be employed for such purpose. In the present embodiment, rendering engine 12 keeps track of which sub-sections 22 of past buffers have been marked dirty due to current changes separate from state bits 24 themselves.

After being output to panel 18 and having state bits 24 reset, previous screen buffer 20 (right-most position, FIG. 3) is rotated to the left-most position to become a back-buffer 20. Rendering engine 12 writes into the left-most back buffer 20. First, rendering engine 12 refers to its records regarding which subsections 22 of the oldest buffer (created earliest, likely the screen buffer) had "current changes" thereto when it was rendered. These sub-sections 22 are considered "interim changes" for the current buffer. Rendering engine 12 then copies the indicated sub-sections 22 from the oldest buffer in the chain to the current buffer ("copied subsections"). It should be appreciated that the determination of which sub-sections 22 are to be copied to the current buffer is determined from the rendering engine's tracking, not the state bits 24 themselves.

When determining interim changes, only the current changes for each past buffer are considered. Thus, the use of state bits 24 would be over inclusive in that the state bits indicate both interim changes and current changes for those past buffers. Copying the current changes of the screen buffer to the current buffer updates the current buffer to be consistent with the screen buffer. Rendering engine 12 then copies all the sub-sections 22 having current changes (as indicated by the rendering engine's tracking) from the next oldest buffer to the current buffer. This copying updates the current buffer to be updated relative to both the oldest and second oldest buffers. This copying is performed for all buffers in the chain such that the current buffer is updated to the buffer immediately preceding it in the swap chain. Each copying causes writing to the current buffer and causes state bits 24 to be set to dirty for each associated sub-section 22 of current buffer 20.

Rendering engine 12 then proceeds to write data into current buffer 20 for the next frame. Writing is done only for those pixels for which changes have been indicated by data source 11. This provides the current changes for the current buffer 20. The writing renders sub-sections 22 containing the written pixels as dirty and state bits 24 are so set (in addition to those set as dirty due to interim changes). Accordingly, those sub-sections 22 that are marked as dirty are those that have either interim changes, current changes, or both.

The notations of "dirty," are later used by display controller 16 to determine which sub-sections of a screen buffer are read out and provided to panel 18. Thus, the sections that are provided to panel 18 are those sub-sections 22 that have experienced interim changes, current changes, or both. Those changed sub-sections 22 are placed into the buffer either by copying from a previous buffer (interim changes) or by writing by rendering engine 12 at the direction of data source 11 (current changes). Once the proper sub-sections 22 are output to panel 18, the state bits 24 are reset. However, rendering engine 12 retains an indication of which areas had dirty state bits 24 due to current changes associated therewith. This retention is used for determining which sub-sections 24 need to be copied to subsequent buffers (as described above).

The above solutions are also able to be modified to provide power savings when providing scaling of an image. One such modified solution includes the use of a third sub-section status of "adjacent to dirty." The clean/dirty algorithm knows the extent of the scaling and what specific sub-sections 22 are dirty. The clean/dirty algorithm further determines which sub-sections 22 are close enough to the dirty sub-sections 22 to become relevant for the extent of the scaling. For sub-sections 22 that are clean, but that are close to dirty pixels, the clean/dirty algorithm assigns the status of "adjacent to dirty." The display controller 16 then knows to read the "adjacent to dirty" sub-sections 22 to be used as the display controller 16 calculates the actual output to panel 18 based on the actually "dirty" sub-sections 22, the vertical and horizontal scaling ratio, and any adjacent sub-sections enveloped due to the scaling. As will be appreciated, scaling is but one kind of graphics post-processing technique known to those of ordinary skill in the art. Other forms of post-processing are known to use differing numbers and locations of adjacent sub-sections. For example, some deblocking techniques (another type of post-processing) reference only the immediately spatially adjacent sub-section. Other deblocking techniques use more than one adjacent sub-section (one immediately adjacent to the subsection of focus—e.g., a dirty sub-section—and one or more sub-sections that are spatially farther removed than the immediately adjacent sub-section).

It should be appreciated that the size of sub-portions 22 can be altered to give varying degrees of granularity. A smaller sub-portion 22 creates more sub-portions 22 and provides an increased likelihood that sub-portion 22 will be found to be "clean." Accordingly, smaller sub-portions create more up-front processing work and need more memory storage but increase the potential for saving power and processing at display controller 16. Regardless of the size of sub-section, each sub-section 22 is treated as a single entity with respect to being denoted as a changed portion or not changed portion.

The above detailed description and the examples described therein have been presented for the purposes of illustration and description only and not for limitation. For example, the operations described may be done in any suitable manner. The method may be done in any suitable order still providing the described operation and results. It is therefore contemplated that the present embodiments cover any and all modifications, variations or equivalents that fall within the spirit and scope of the basic underlying principles disclosed above and claimed herein. Furthermore, while the above description describes hardware in the form of a processor executing code, hardware in the form of a state machine, or dedicated logic capable of producing the same effect are also contemplated.

The software operations described herein can be implemented in hardware such as discrete logic fixed function circuits including but not limited to state machines, field programmable gate arrays, application specific circuits or other suitable hardware. The hardware may be represented in executable code stored in non-transitory memory such as RAM, ROM or other suitable memory in hardware descriptor languages such as but not limited to RTL and VHDL or any other suitable format. The executable code when executed may cause an integrated fabrication system to fabricate an IC with the operations described herein Also, integrated circuit design systems/integrated fabrication systems (e.g., work stations including, as known in the art, one or more processors, associated memory in communication via one or more buses or other suitable interconnect and other known peripherals) are known that create wafers with integrated circuits based on executable instructions stored on a computer readable medium such as but not limited to CDROM, RAM, other forms of ROM, hard drives, distributed memory, etc. The instructions may be represented by any suitable language such as but not limited to hardware descriptor language (HDL), Verilog or other suitable language. As such, the logic and circuits described herein may also be produced as integrated circuits by such systems using the computer readable medium with instructions stored therein. For example, an integrated circuit with the aforedescribed logic and structure may be created using such integrated circuit fabrication systems. In such a system, the computer readable medium stores instructions executable by one or more integrated circuit design systems that causes the one or more integrated circuit design systems to produce an integrated circuit.

What is claimed is:

1. A method of providing image frames including:
   using a memory having a swap buffer chain comprising at least three buffers, including a present buffer, a first back buffer, and a second back buffer;
   determining when a rendering engine has written to a first portion of a first frame in the first back buffer since a last time the present buffer was read by a display controller;
   determining when the rendering engine has written to a first portion of a second frame in the second back buffer since the last time the present buffer was read by the display controller;
   determining that a first portion of a present frame in the present buffer has changed by tracking which portion of the present frame in the present buffer, the first frame in the first back buffer, and the second frame in the second back buffer has changed since the last time the present buffer was read by the display controller;
   responsive to determining that the first portion of the present frame in the present buffer has changed, outputting the first portion of the present frame that has changed along with any other portions of the present frame that have changed relative to the first and second frames without outputting portions of the first and second frames that have not changed,
   wherein the tracking includes detecting an interim change caused by a copying operation from at least one of the first back buffer and the second back buffer, and detecting a current change in the present buffer caused by a writing operation performed by the rendering engine to the present buffer.

2. The method of claim 1, wherein the first frame is sub-divided into a plurality of portions.

3. The method of claim 2, wherein each portion is a contiguous polygon.

4. The method of claim 1, wherein the rendering engine only writes portions of the frame buffer for portions that have changed since the last writing to the frame buffer.

5. The method of claim 1, wherein the first frame is at least partially written to the first back buffer that is a back buffer of the swap buffer chain and outputting reads portions out of the first back buffer when it is a screen buffer of the swap buffer chain.

6. A method of providing image frames including:
   responsive to one or more portions of a first frame having changed relative to one or more other frames, outputting the portions of the first frame that have changed relative to the one or more other frames without outputting portions of the first frame that have not changed relative to the one or more other frames, each portion being determined to be changed if a rendering engine has written to a frame buffer for a location within boundaries of the portion;
   applying post processing to the changed portions prior to outputting the portions, the post processing including reading portions adjacent to the changed portions, post processing including processes that act upon a received decoded image and improve image quality based on the read portions adjacent to the changed portions.

7. The method of claim 6, wherein the post processing is scaling.

8. The method of claim 6, wherein the read portions that are adjacent to the changed portions are those necessary to conduct a selected post processing technique.

9. A display refresh device including:
a rendering engine operative to write image information to one or more memory buffers;
a plurality of memory buffers each having a plurality of portions;
indicators of a change of status for each of the plurality of portions of each of the plurality of memory buffers, each portion being determined to be changed if a rendering engine has written to pixels within the portion of the a memory buffer;
a post processor operative to receive decoded image portions and apply post processing to the changed portions prior to outputting the portions, the post processing providing an improvement in image quality, the post processing including reading portions adjacent to the changed portions, the improvement in the image quality performed based on the read portions adjacent to the changed portions; and
a display controller operative to interpret the indicators to selectively read portions out of a first buffer of the plurality of memory buffers.

10. The device of claim 9, wherein the display controller is operative to read only portions having an associated indicator that indicates the portion is changed.

11. The device of claim 10, wherein the display controller is operative to read only portions having an associated indicator that indicates the portion has changed since the last time the memory buffer was used.

12. The device of claim 9, wherein the plurality of memory buffers are part of a swap buffer chain.

13. The device of claim 9, wherein each buffer has corresponding identically placed and sized portions.

14. The device of claim 9, further including a change determiner operable to set the indicators of change for each of the plurality of memory buffers.

* * * * *